United States Patent
Knapp

(10) Patent No.: US 6,763,060 B1
(45) Date of Patent: Jul. 13, 2004

(54) COMMUNICATION SYSTEM EMPLOYING A NETWORK OF POWER MANAGED TRANSCEIVERS THAT CAN GENERATE A CLOCKING SIGNAL OR ENABLE DATA BYPASS OF A DIGITAL SYSTEM ASSOCIATED WITH EACH TRANSCEIVER

(75) Inventor: David J. Knapp, Austin, TX (US)

(73) Assignee: Oasis Silicon Systems, Austin, TX (US)

( * ) Notice: Subject to any disclaimer, the term of this patent is extended or adjusted under 35 U.S.C. 154(b) by 0 days.

(21) Appl. No.: 09/253,469

(22) Filed: Feb. 19, 1999

(51) Int. Cl.$^7$ ................................................ H04B 1/38
(52) U.S. Cl. ...................... 375/219; 375/222; 375/356; 375/376; 327/147; 327/156
(58) Field of Search ................................ 375/219, 222, 375/356, 376, 232, 326, 327, 375; 370/241, 395.62; 327/147, 156; 331/1 R, 10, 14, 1 A

(56) References Cited

U.S. PATENT DOCUMENTS

| | | | | |
|---|---|---|---|---|
| 4,484,028 A | * | 11/1984 | Kelley et al. | 379/93.14 |
| 4,911,515 A | * | 3/1990 | So et al. | 359/173 |
| 5,317,198 A | | 5/1994 | Husbands | 307/116 |
| 5,475,877 A | * | 12/1995 | Adachi | 455/343 |
| 5,491,721 A | * | 2/1996 | Cornelius et al. | 375/222 |
| 5,602,669 A | * | 2/1997 | Chaki | 398/188 |
| 5,737,370 A | | 4/1998 | Hetzel | 375/356 |
| 5,963,068 A | * | 10/1999 | Hardesty et al. | 327/156 |
| 6,005,904 A | * | 12/1999 | Knapp et al. | 375/376 |
| 6,208,621 B1 | * | 3/2001 | Ducaroir et al. | 370/241 |

FOREIGN PATENT DOCUMENTS

| | | |
|---|---|---|
| DE | 196 37 417 | 3/1998 |
| EP | 0 841 779 | 5/1998 |

OTHER PUBLICATIONS

Patent Abstracts of Japan, Publication No. 02097150, Published: Apr. 9, 1990.
International Search Report, Application No. PCT/US 00/04615, mailed: Jun. 30, 2000.

* cited by examiner

*Primary Examiner*—Shuwang Liu
(74) *Attorney, Agent, or Firm*—Kevin L. Daffer; Conley Rose P.C.

(57) ABSTRACT

A communication system is provided for interconnecting a network of digital systems. The communication system includes a communication line and a transceiver placed between the communication line and each digital system. The transceiver includes a receiver which can be selectively powered down whenever activity within the communication line ceases. The external conductors extending from each transceiver integrated circuit to an associated digital system are minimal, and the status of a clock/status signal conductor will indicate if the digital system is in a low power state (no clocking signal) or whether the digital system will be in a normal or protected clocking state. When a communication system is initially started, activity within the communication line will not lock the recovery circuits of the transceiver and, therefore, the transceiver will forward the received signal back out the transceiver without causing that signal to enter the associated digital system. In this manner, the latching/delay circuitry of the digital system is bypassed and the initial activity within the communication line can be sent quickly through all nodes of the communication system for rapid start-up procedures.

12 Claims, 5 Drawing Sheets

COMMUNICATION SYSTEM EMPLOYING A NETWORK OF POWER MANAGED TRANSCEIVERS THAT CAN GENERATE A CLOCKING SIGNAL OR ENABLE DATA BYPASS OF A DIGITAL SYSTEM ASSOCIATED WITH EACH TRANSCEIVER

BACKGROUND OF THE INVENTION

1. Field of the Invention

This invention relates to a communication system comprising a network of interconnected transceivers and associated digital systems and, more particularly, to mechanisms for selectively clocking the digital systems, bypassing data from being routed through the digital systems, or for reducing power consumption within transceivers and digital systems depending on whether data is received by the transceiver, and/or whether the transceivers are locked in sync with the data.

2. Description of the Related Art

Communication systems are generally well-known as containing at least two nodes interconnected by a communication line. Each node may include both a transmitter and a receiver, generally referred to as a "transceiver". The transceiver provides an interface between signals sent over the communication line and a digital system which operates upon that signal in the digital domain.

A set of nodes interconnected by a communication line can be referred to as a communication network. A transmitter within one node can transmit a signal to one or more receivers in various nodes across the network. In high speed applications, the signal transmitted across the network can contain instructions and/or data, which conceivably could be audio data, video data, or both, and therefore the network may be considered a multi-media network. The transfer rate of multi-media signals is generally quite high and therefore requires a relatively high speed communication line, a suitable line being an optical fiber, for example.

If an optical fiber is used, then an interface which converts light energy to an electrical signal recognized by each transceiver is needed. That interface is generally a photosensor at the receive end of the communication line, or a light emitting diode at the transmit end. The interface is therefore an optical interface and therefore the transceiver can be considered a fiber optic transceiver. It is believed that most conventional fiber optic transceivers generally encompass elements which perform light/voltage conversion and nothing else. The system associated with each transceiver may employ both an analog and a digital section which perform manipulation of the received signal, processes that signal, and thereafter presents a transmitted signal compatible with signals forwarded across the optical fiber. Accordingly, a conventional, optical multi-media network typically employs a rather simplistic fiber optic transceiver, and a digital processing system, at each node of the network.

The digital system may be called upon not only to process the signal preferably in real-time, but also to process those signals synchronously. Therefore, conventional digital systems not only require a receiver with accurate amplification and data detection, but further utilize a phase-locked loop ("PLL") useful in recovering a clocking signal from the received data. If the amplifiers and data detecting circuits at the receive end, drivers at the transmit end, and the PLL clock recovery circuits impute noise to, or receive noise from, the digital core of the digital processor, then data detection, clock recovery, data transmittal, and generalized data processing may be adversely affected. It would be desirable to minimize the cross talk between the digital processing core and the incoming data detection, clock recovery, and outgoing data driving circuits. Digital signal transitions, and/or latching circuits operating on those transitions, can oftentimes induce significant amounts of noise upon the power and ground conductors extending across the digital system to provide power and ground to the more sensitive clock and data recovery circuits, as well as the data transmit driver.

In addition to minimizing noise susceptibility of the sensing circuits, it would also be of benefit to provide power management to at least a portion of those circuits. In this manner, a low-power application can be realized as a significant improvement to conventional multi-media communication networks. Coupled with noise isolation and power management, the sensing portion of each node should also be made immediately responsive to the data signal forwarded from the network master. In this fashion, the slave nodes can recover a clocking signal in parallel and concurrent with each other so that the clocking signal is available as soon as possible to the corresponding digital systems.

SUMMARY OF THE INVENTION

The problems outlined above are in large part solved by an improved multi-media communication system. The communication system includes a set of nodes, wherein each node involves a transceiver interface and a digital system. The transceiver is coupled between the communication line and a corresponding digital system, and is used to modify the transmission format and/or protocol into a sequence of bits recognized by one or more digital systems within corresponding nodes. The transceiver is purposely placed on one or more monolithic substrates separate from a substrate bearing a digital system. The sensitive sensing and driving circuits, as well as the clock recovery PLL, may be embodied upon the transceiver separate from the corresponding digital system, and the noise induced by that system.

The present transceiver includes both a receiver and a transmitter. The receiver senses data transmitted across the communication line and performs conditioning and amplification to that signal before transferring it to the digital system for processing. Additionally, the receiver may include a PLL which recovers a clock from the received signal, and uses the recovered clocking signal to synchronize operations within the corresponding digital system. Of benefit, the number of conductors which link the transceiver and corresponding digital system is minimized as, for example, a data output conductor, a clocking/status signal output conductor, power, and ground. The power and ground conductors may be used to apply a common VDD and VSS supplies between the transceiver and corresponding digital system. It is noted, however, if a common power and ground supply is not needed, then only two conductors need be employed between the receiver of the transceiver and the respective digital system.

The sensing circuitry within the receiver generally operates at speeds matching the incoming data. For example, if the data rate of the incoming signal, and therefore the operating speed of the sensing circuitry, is several Mbits/second, or more preferably 50 Mbaud or greater, then the power consumed by the sensing circuitry can be rather substantial. Instead of maintaining power to the sensing circuitry during times when a signal is not present on the communication line, the receiver utilizes an activity detector which de-couples power to the sensing circuit in times when data is not present on the receiver receive port. In this manner, the present transceiver maintains power to power consumptive devices only when an input signal is present upon the receive port. During all other times, the power consumptive amplifiers, comparators, and clock recovery circuits (i.e., PLL) are powered down. Thus, a multi-media network employing the present transceivers can advantageously be placed in a low power environment, or an environment in which power is drawn from a portable power supply, such as a battery. For example, the multi-media network can be used in an automotive application, where audio, video, or generalized traffic information, are being sent between digital processors arranged throughout the automobile. Such processors include, for example, speech encoders/decoders, video/audio processors, video monitors, audio amplifiers (and associated speakers), sensors, calculators, computers, and FM/AM tuners, all of which can be placed on-board existing automobiles to enhance both usability and performance of the automobile. In an automotive environment, it is desirable that the communication line be fiber optic, and the light-transmissive data be isolated from each transceiver by photosensors and LEDs. Optical fibers can accommodate the relatively high baud rates of the multi-media network, but also can reliably send those rates to nodes distally located from one another at various locations about the automobile.

A transceiver which is isolated on one or more chips separate from the noisy digital systems, and which contains receive-sensing circuitry and clock recovery mechanisms is henceforth referred to as a "smart" transceiver. The smart transceiver contains active and passive components which can, in addition to its sensing, driving, and clock recovery functions, also selectively powers certain components only when incoming data is present on the receive port. The smart transceiver therefore has power management capability and, furthermore, can selectively bypass the digital system connected to the transceiver. The digital system is bypassed at times when the input signal is present upon the receive port, yet clock recovery (i.e., PLL "locked" status) has not yet occurred.

The bypass feature occurs whenever, for example, input data in the form of optical energy is received upon the receive port of the transceiver, yet time has not sufficiently elapsed to allow the PLL to lock its voltage-controlled oscillator ("VCO") output to the incoming data stream transitions. In a network environment, the network is arranged having a plurality of nodes typically configured in a ring. The first node slave within the ring will then initially receive an incoming signal from a master. Rather than waiting for that node's transceiver PLL to lock upon the incoming data stream frequency and phase, the first node receiver simply forwards the unlocked data stream signal from the receiver output to its transmitter input, whereupon the first node transmitter output will then be immediately dispatched to the next node within the network. That node will perform the same bypass operation, thereby allowing all nodes within the network to receive somewhat in parallel the incoming optical signal. This affords the PLL in each node to lock upon the incoming light stream at approximately the same time, thereby achieving relatively concurrent locking among all clock recovery PLLs within each network node. Thereafter, once valid data is sent across the network, any node within that network will be able to immediately recognize and process the valid data since each and every node will have a pre-existing, recovered clocking signal.

According to one embodiment, a communication system is present. The communication system includes a plurality of digital systems interconnected by respective transceivers to a communication line. At least one of the transceivers comprises a receiver adapted to enter a relatively high power consumptive state from a relatively low power consumptive state during times when a signal is present within the communication line. When the signal is absent, the receiver transitions from the high power consumptive state to the low power consumptive state. The receiver includes a PLL and incoming data sensing circuits. The PLL produces a clocking signal and forwards the clocking signal to a respective digital system when the PLL is locked in sync with transitions of the incoming signal. When the incoming signal is present yet the PLL is not yet locked in sync with that signal, the PLL will produce a clocking signal at a reduced clocking frequency to protect against overdriving the digital system connected to receive that clocking signal. Therefore, at times in which the PLL is in an unlocked state, it can be assured that the digital system will not be driven at a rate which exceeds the maximum frequency at which it can operate.

According to another embodiment, the digital system can include a lock detector which bypasses forwarding the incoming signal sent to the receiver, through the receiver, and to the digital system. Instead, the lock detector will forward the incoming signal directly to a transmitter whenever the PLL is not locked in sync with that incoming signal.

According to yet another embodiment, a receiver is provided having a receive port and an activity detector coupled to the receive port. The activity detector produces an activity signal during times when an input signal is forwarded to the receive port. A power supply generator is coupled to the activity detector which then produces a power supply output upon receipt of the activity signal. Coupled to the power supply generator and the receive port is a receiver that comprises receive/sensing circuitry, and preferably a PLL. The PLL produces a clocking signal from the input signal during times when the power supply output is produced. The activity detector includes, for example, a comparator and a timer, both of which work in conjunction to produce the activity signal if a magnitude of the input signal upon the receive port exceeds a reference voltage for a defined amount of time. A lock detector can be attributed to (i.e., embodied upon ) the digital system or, alternatively, attributed to the transceiver. In the latter instance, the lock detector is output from the transceiver and forwarded to a multiplexer coupled to select the input signal for transmission to a transmitter in lieu of an output from the digital system if the detector yields an unlock value.

According to yet a further embodiment, a method is provided for regulating power consumption within, and clocking signal output from, a transceiver. While maintaining power needed to detect if and when an input signal is forwarded to the transceiver, power is de-asserted to sensing and calibration circuitry of the receiver which receives the input signal, as well as de-asserting power to a PLL within the receiver whenever an input signal is absent from a receive port of the receiver. A clocking signal can be produced from the PLL by asserting power to the PLL only when the input signal is present. It is understood that the PLL is preferably a part of the receiver; however, the PLL can be part of the digital system and the receiver merely generates a status signal to the power supply generator depending on whether the PLL is to receive power. The state of the status signal is thereby dependent on whether activity is detected in the network via the input signal.

BRIEF DESCRIPTION OF THE DRAWINGS

Other objects and advantages of the invention will become apparent upon reading the following detailed description and upon reference to the accompanying drawings in which.

Figure 1:
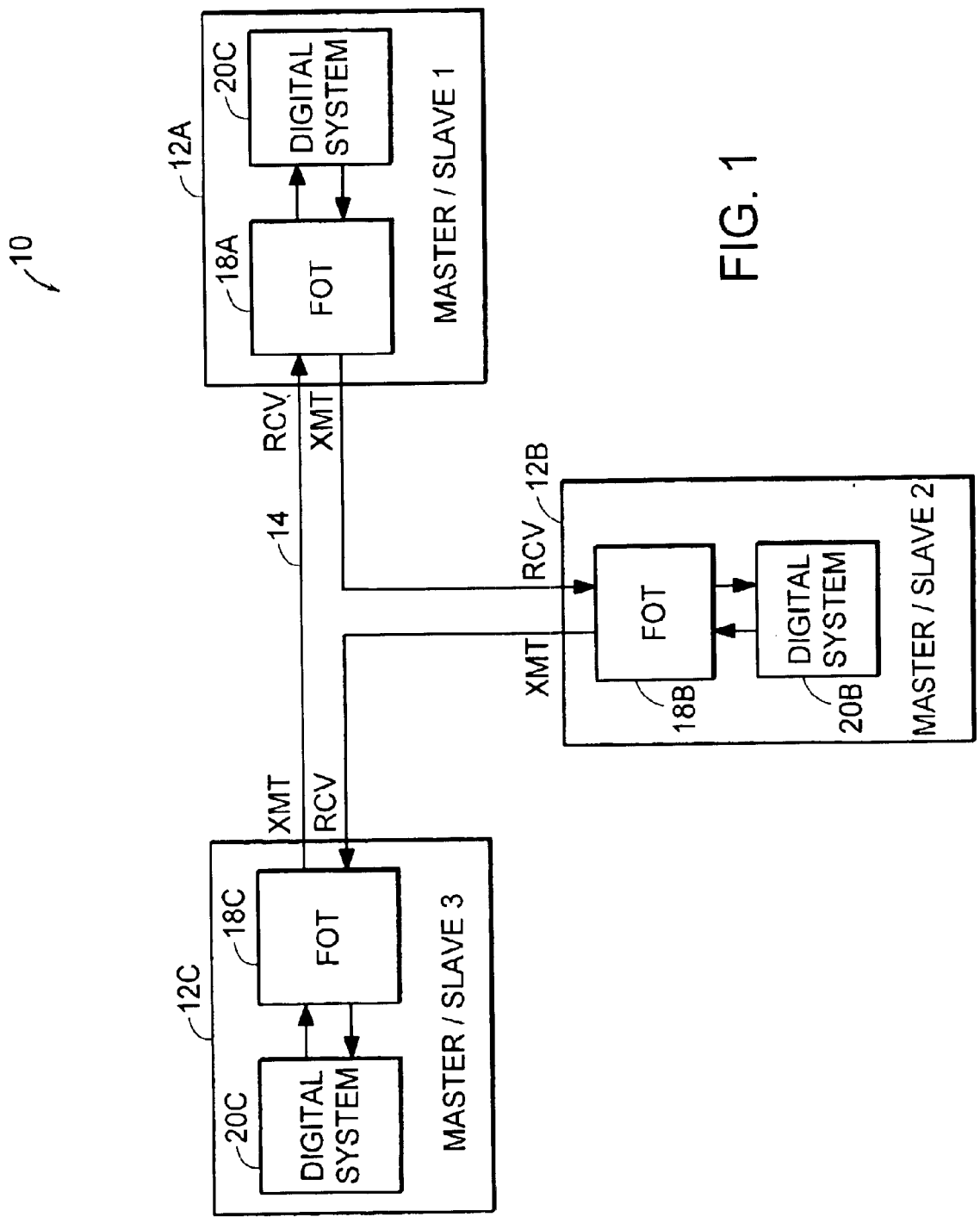
FIG. 1 is a block diagram of a communication system, wherein at least one node of the communication system includes a digital system and a transceiver placed within a module comprising one or more monolithic substrates arranged separate from the digital system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning to the drawings, FIG. 1 illustrates a communication system 10 having a set of nodes 12 interconnected within a network. Each node 12 is interconnected by a communication line 14 to form a ring. Signals forwarded across the communication line 14 are preferably synchronized to form a synchronized ring topology network of interconnected nodes. Thus, all nodes are operably synchronized to a timing reference within a network master. A suitable communication line comprises an optical fiber.

Each node 12 operates as either a master or a slave interconnected as communication system 10. One node of the communication system is designed as a master which initiates the communication system 10, and provides a timing reference for the network. The master may also contain a register that is written to by software associated with that master. The software sets the register so that the node attributed to that register is designated as a master separate from other registers of other nodes designated as slaves.

Within each node 12 is a smart transceiver which, if the communication line 14 is an optical fiber, that transceiver is deemed a fiber optic transceiver or "FOT", shown as reference numeral 18. Transceiver 18 provides an interface between the communication signal within communication line 14 and corresponding digital system 20. Transceiver 18 is a smart transceiver and thereby includes a receiver for sensing a signal provided to a receiver port, recovering a clock signal from that incoming signal, and further includes a transmitter for driving an output upon a transmit port. The receive and transmit ports for each transceiver are labeled as "RCV" and "XMT".

Digital system 20 involves any system which operates primarily in the digital realm to perform relatively rapid manipulation and/or processing of digital signals forwarded thereto. The manipulations or processing functions can occur within one or more integrated circuits, and those circuits are separate from a monolithic substrate upon which at least a portion of transceiver 18 is embodied. Of benefit is a minimal number of conductors which extend externally between a transceiver and corresponding digital system within each node. In this fashion, relatively few additional pin connectors need be introduced.

Communication system 10 can find applications in any environment in which generalized data, instructions, and/or data (i.e., video, voice (audio)), can be transferred between nodes or distributed among nodes. One exemplary application involves a low power application where transceivers are partially powered down during times when a signal is not present at the receive port of the transceiver. A suitable low power application would arise in an automotive setting, where signals are not present when the automobile is turned off and, therefore, the communication network 10 enters a low power or "sleep" state.

Figure 2:
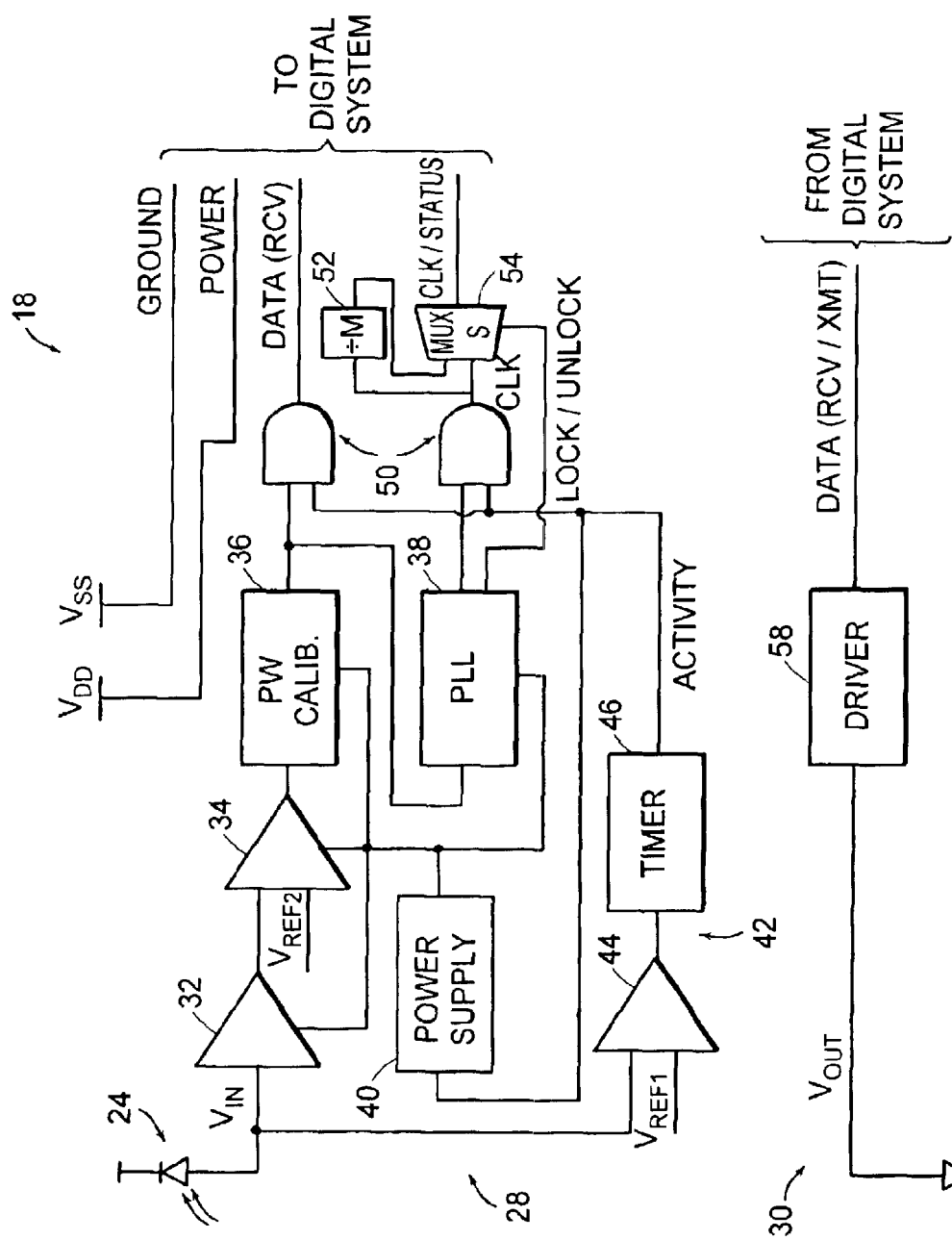
FIG. 2 is a block diagram of a receiver and transmitter, according to one embodiment, of the transceiver shown in FIG. 1.

FIG. 2 illustrates a transceiver 18 interposed between a communication line interface 24 and an associated digital system, according to one embodiment. Interface 24 is dependent on the medium through which the communication signal is sent. According to one example, the communication line is an optical fiber and therefore interface 24 is used to convert modulated light into an input voltage $V_{IN}$. The receive port is that which receives $V_{IN}$ from the communication line, and the transmit port is that which transmits $V_{OUT}$ from the transmitter. Similar to interface 24, the transmitter portion of transceiver 18 also includes an interface 26 which converts $V_{OUT}$ to the proper format for transmission across the communication line. In the example shown, interface 24 comprises a photosensor and interface 26 comprises a pin diode, or LED. Further shown is transceiver 18 comprising both a receiver 28 and a transmitter 30.

Receiver 28 includes a low noise transimpedance amplifier 32, which has a bandwidth and an open loop gain high enough to handle, e.g., a 50 Mbaud data rate. Amplifier 32 is intended to force the external pin diode 24 to a fixed reverse bias voltage. Amplifier 32 thereby has a wide dynamic range to accommodate the range of currents being received. Coupled to the output of amplifier 32 is a high-speed comparator 34. Comparator 34 takes the amplified signal and compares it with hysteresis against a predetermined trip-point. The trip-point is set by a reference voltage $V_{REF2}$. Although not necessary nor required, a pulse-width distortion correction/calibration circuit 36 can be used to take the output from comparator 34 and correct the rising or falling edges of the received signal. It is intended that circuit 36 provide approximately 50% duty cycle to compensate for inaccuracies in the pin diode and LED turn-on and turn-off times. As merely an example, circuit 36 may include an even number of inverters connected in series. The second inverter within the series can be powered from a differential output of a transconductance amplifier, wherein one input of that amplifier is connected to a voltage divider, and the other input is coupled from the output of the series-connected inverters.

According to one embodiment, PLL 38 is embodied on the same integrated circuit as the receiver circuits, such as amplifier 32, comparator 34, and calibration circuit 36. Furthermore, the receiver circuits can be embodied on the same, or a dissimilar, monolithic substrate as the digital system. Still further, the receiver circuits can be formed within a module that is the same as or different from a module which houses the transmitter. PLL 38 takes the data output from circuit 36 and generates a low jitter clock output which can be used to sample the data output from circuit 36. PLL 38 can include a phase-frequency detector, low-pass filter, voltage-controlled oscillator, and an output of the voltage-controlled oscillator is fed back to the phase-frequency detector, according to well-known design. The output of the voltage-controlled oscillator is a clocking signal which may or may not be active, or can be clocked in a protected mode, depending on the status of activity within the communication system.

Initially, the receiver circuitry (i.e., amplifier 32, comparator 34 and calibration cicuit 36), as well as the PLL is in a low power mode, and the output clocking signal is maintained in a steady state low value since there is no activity in the network (i.e., since an input signal is not present on the receive port). Once activity in the network is detected, PLL 38 enters normal operation. However, PLL 38 requires a certain amount of time to elapse before it will enter a locked state. When the PLL is unlocked and its frequency is outside, for example, a 5% range of the locking frequency, the clock signal output frequency is divided by four. Once the PLL frequency is close to the locking frequency, the clock signal output returns to a normal clocking signal frequency and the lock/unlock conductor bears a valid lock signal indicated by that conductor yielding a relatively high voltage value. Preferably, the lock signal does not go high until after three valid frames have been detected by PLL 38. Once activity in the network ceases (i.e., the input signal upon the receive port terminates), the lock signal will go low and the clocking signal output will also go low.

Figure 3:
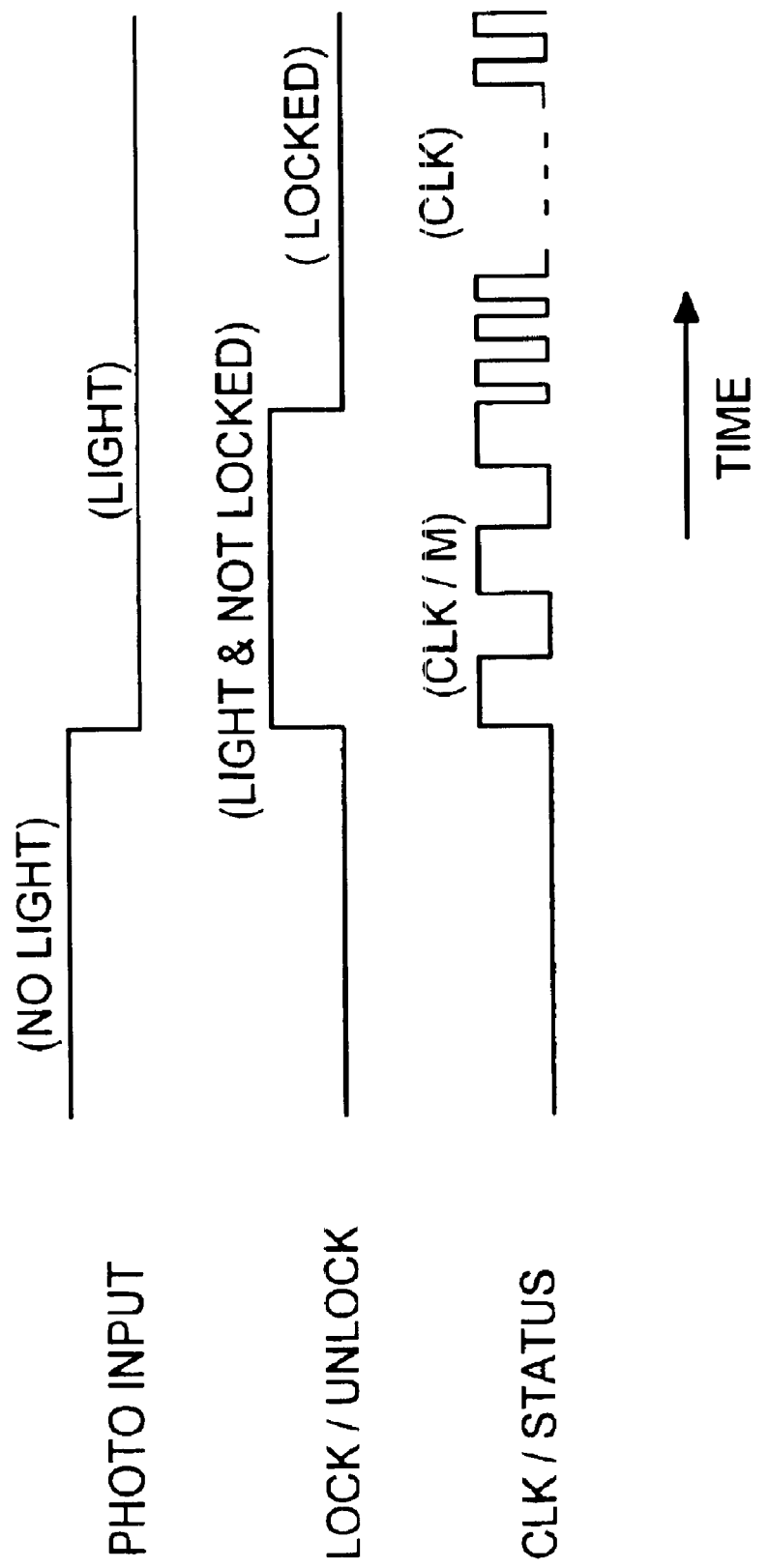
FIG. 3 is a timing diagram of a clock/status output signal dependent upon an input signal forwarded to the receiver and whether or not the PLL within the receiver is locked in sync with the input signal.

Details regarding the PLL clock/status output and lock/unlock output are further described in FIG. 3. Namely, if no light is present (no activity is present) within the communication system, then the PLL outputs will yield an unlock signal and no transitory clocking values. However, when light is present and the PLL has yet to lock, the clocking signal output will be a factor of M (where M may be equal to four) less than the normal clocking output. Once the PLL is locked and light is still present, then the clocking signal output will increase to its appropriate frequency which, according to one embodiment, is proportional to the data rate of $V_{IN}$.

Attributed to receiver 28 is a power supply, or simply a switch to a power supply, shown as reference numeral 40. Power supply 40 responds to a network activity detector 42. It is to be noted that power supply 40 includes a generator that produces a selectable power supply output. The output can be current and/or voltage, wherein the current is selectibly supplied to the various receiver components ("receive circuitry"), and voltage may be used to ensure there are no floating nodes or high current paths during times when activity is not detected. Detector 42 may include a comparator 44 and a timer 46. Comparator 44 is coupled to sense a very small current being generated by a pin diode or photosensor, wherein in both instances the pin diode or photosensor comprise interface 24. Once activity is detected, a low-power oscillator may be used to power up and monitor the output of the comparator. If the output of the comparator still indicates activity at the pin diode, full power is resumed. In the case of a glitch at the pin diode, comparator 44 will indicate no activity after the oscillator is timed out. Then, the oscillator will power down to save power and the receiver 28 will enter a low power mode. Detector 42 thereby requires a reference voltage $V_{REF1}$ against which the input voltage $V_{IN}$ will be compared and, if $V_{IN}$ exceeds $V_{REF1}$, then activity is detected, and timer 46 ensures that the activity must be maintained for a certain timeframe, e.g., 1.0 millisecond, before an activity signal will be present at the timer output.

The activity signal is fed to power supply 40 to indicate that power must be applied to items 32, 34, 36, and 38. If the activity signal is not present, then those items remain in their power down state and receiver 28 is said to be in a low power mode. Accordingly, in the low power mode only detector 42 is powered.

The activity signal is also used to enable the data output from circuit 36 and the clocking signal output from PLL 38. Logic 50 can be used to serve that purpose. Only if activity is detected will the received data be forwarded to the digital system and the high or low speed clocking signal be sent to the digital system via the clock/status pin. If PLL 38 is unlocked, then the unlocked signal will select output from the divide-by-M output 52. Otherwise, a locked PLL will select the higher speed clocking output. A multiplexer 54 may serve to perform that select function.

Receiver 28 is shown to have four conductors forwarded to the digital system. If the digital system maintains its own ground and power supply, then only two conductors need be presented. The received data (DATA RCV) is processed by the digital system synchronously with transitions of a clocking signal within the clock/status conductor. Once processing is complete, then data is returned from the digital system as transmit data (DATA XMT). However, if the digital system is to be bypassed based on the status of the lock/unlock signal, then the received data will be transmitted from the receiver directly back to transmitter 30 as data RCV. In either instance, a driver 58 is used to present the bypassed received data, or processed transmit data, back upon the communication line. Driver 58 includes, for example, a buffer and/or amplifier necessary to account for voltage and timing differences between the communication line and the digital system.

Figure 4:
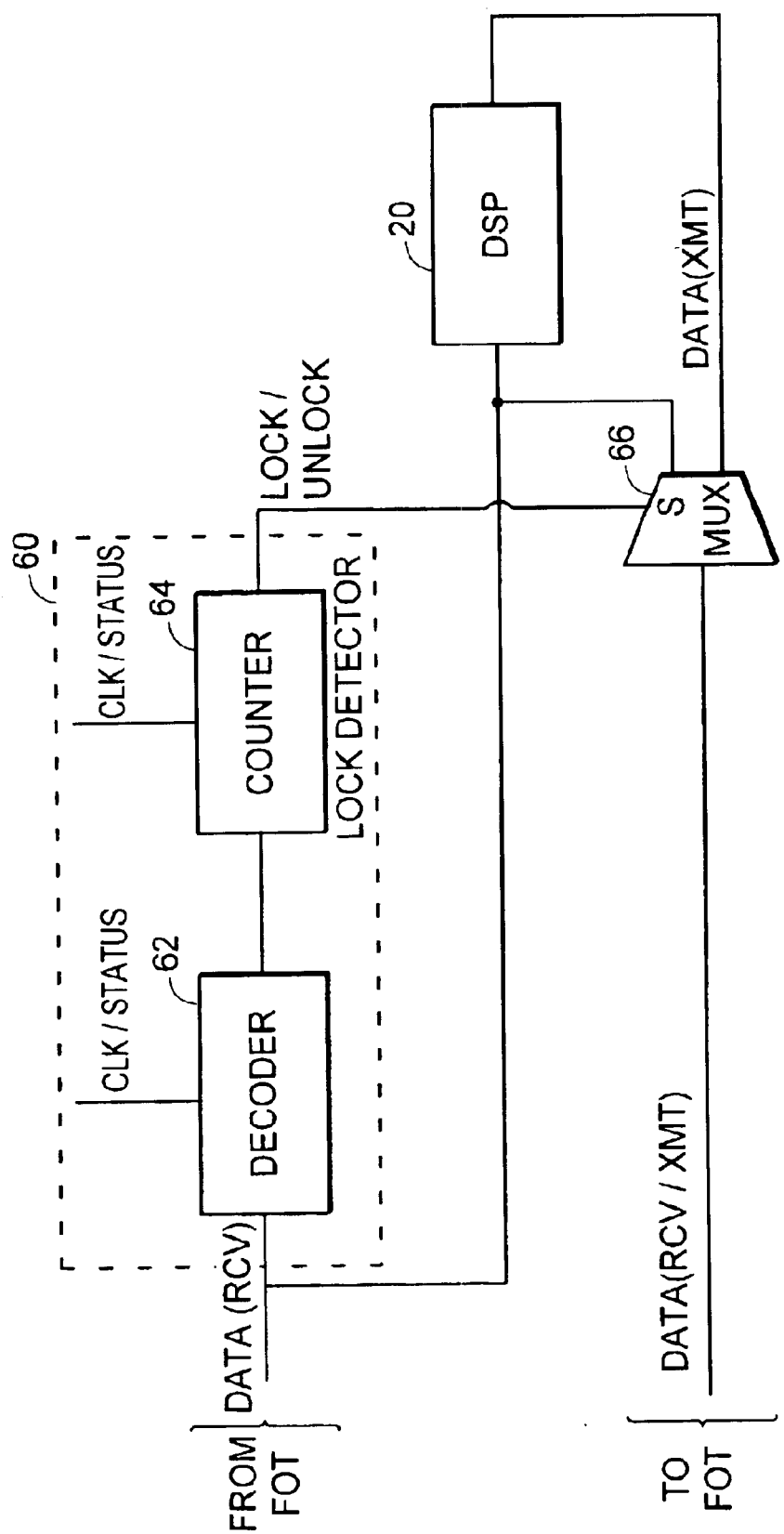
FIG. 4 is a block diagram of a lock detector coupled to receive data from the receiver and to determine whether if data is to be forwarded to the digital system, or if the data is to bypass the digital system and pass directly to a receiver within another node of the communication system to achieve rapid, parallel locking among all networked transceivers which receive an initial sequence of data signal transitions.
Figure 5:
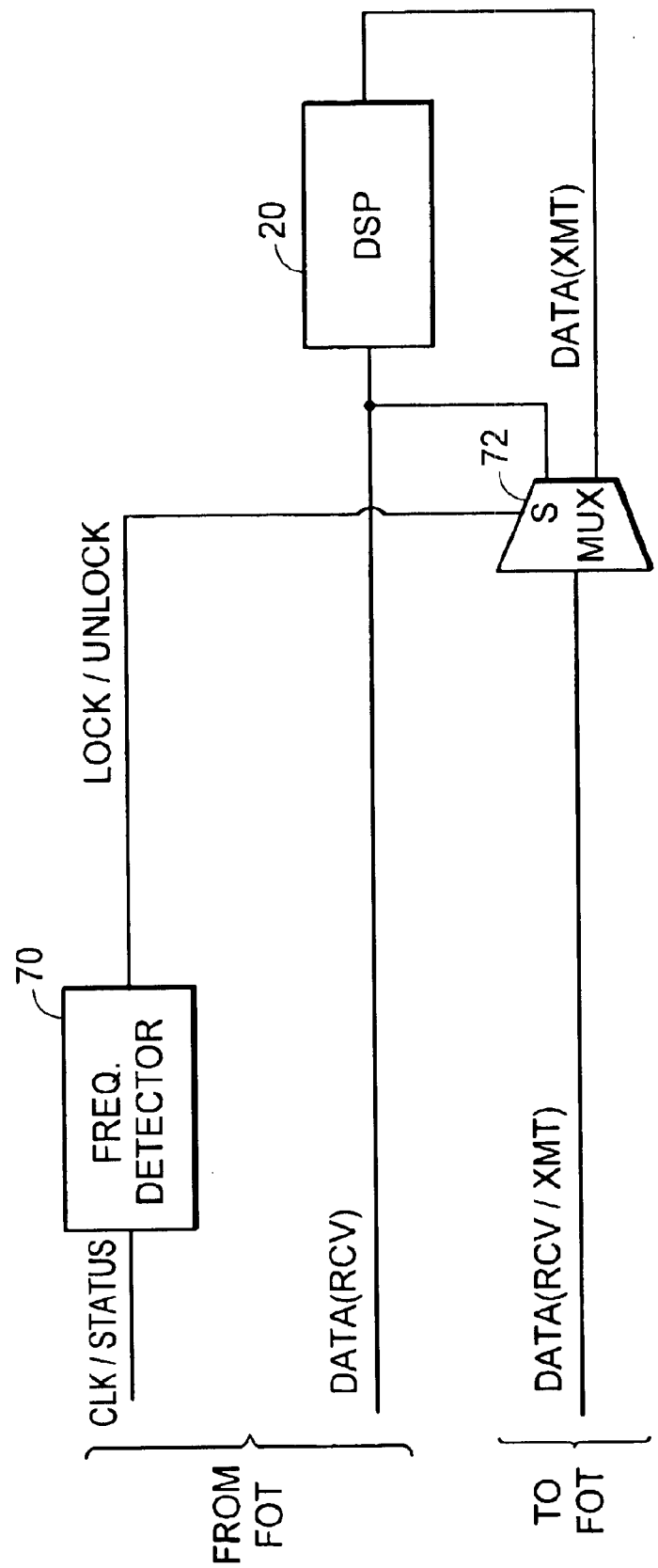
FIG. 5 is a block diagram of a lock detector, according to an alternative embodiment.

FIGS. 4 and 5 illustrate two possible ways in which data can bypass the digital system, or digital signal processor 20. As shown in FIG. 4, a lock detector 60 may be placed within the digital system to receive data from the transceiver. According to one embodiment, detector 60 includes a decoder 62 and a counter 64. Decoder 62 continuously decodes the data received signal and indicates the occurrence of a pattern that matches a predefined set of valid preambles. Thus, decoder 62 may be designed to decode a specific sequence of binary bits. The sequence being sought is preferably contained within a set of preambles of the data stream. The preamble contains a coding which is set upon transmission. If coding changes due to, for example, noise within the transmission channel or corruption as a result of connector misalignment or detachment, then the binary sequence will change. Decoder 62 is designed to decode a specific set of bits within the preambles. If that set does not occur for a set period of time, possibly indicated by a certain count within counter 64, then the lock/unlock signal output from counter 64 will indicate an unlock condition. Counter 64 is a modulo N counter where N clock cycles is the time between preambles. If a valid preamble is detected after N clock cycles, decoder 62 indicates one valid preamble has been detected. Otherwise, it indicates than an invalid preamble has been detected. A preamble decoded after fewer than N clock cycles will reset the counter 64 to re-synchronize it again. When, for example, three valid preambles have been detected correctly, lock is declared. A multiplexer 66 receives the lock/unlock signal at a select input of the multiplexer to choose between whether the DSP output (i.e., data XMT) will be forwarded to the transceiver or whether the data at the output of the receiver (i.e., data RCV) will be sent.

FIG. 5 recognizes that an unlock condition is commensurate with a frequency variation of the input signal caused by noise or corruption as read by the photodetector. That amount of noise or corruption and associated variation in the frequency can be recognized by a frequency detector 70. More importantly, frequency detector 70 can be positioned merely to read changes in frequency of the clock/status signal. If the frequency is steady state indicating no light is received, or if the frequency is rather low and therefore outside the detected range, then it is noted that the PLL is either not powered or unlocked. However, if the frequency falls within a pre-defined range, then detector 70 will produce a lock signal forwarded to multiplexer 72. Multiplexer 72 will then perform the same function as multiplexer 66, shown in FIG. 4.

It is important to note that FIGS. 4 and 5 illustrate only two of possibly many alternate ways to indicate bypass of data if the activity within the network is unstable. This may come in the form of the PLL 38 (FIG. 2) being unlocked, or an improper binary code being sent with the data. In either instance, a resulting unlock signal will allow received data within one node to be sent to a subsequent node, and so forth, to all nodes within the communication system, thereby beneficially providing a signal to which each transceiver PLL can eventually lock upon rather quickly, and in parallel with one another. In this fashion, each transceiver will be more quickly prepared to forward a normal clocking signal to its associated digital system for rapid processing of that received data.

It would be appreciated by those skilled in the art having the benefit of this disclosure, that this invention is believed to be capable of applications involving communication of signals across a network of interconnected digital systems, regardless of whether the network is employed within an automobile or a communication system employs an optical fiber. Various modifications and changes may be made to each and every component of the communication system or transceiver, all of which would be obvious to a person skilled in the art after having the benefit of reviewing this disclosure. It is intended that the following claims be interpreted to embrace all such modifications and changes and, accordingly, the specification and drawings are to be regarded in an illustrative rather than a restrictive sense.

What is claimed is:

1. A method for regulating power consumption within, and clocking signal output from, a transceiver, comprising:
   while maintaining power needed to detect an input signal forwarded to the transceiver, deasserting power to a portion of the transceiver and a phase-locked loop (PLL) within the transceiver whenever the input signal is absent;
   producing a clocking signal from the PLL by asserting power to the PLL of the transceiver whenever the input signal is present; and
   transmitting the input signal from a receiver of the transceiver directly to a transmitter of the transceiver whenever the clocking signal is produced yet the PLL output is not synchronized with the input signal.

2. A communication system, comprising:
   a plurality of digital systems interconnected by respective transceivers to a communication line, wherein at least one of the transceivers comprises a receiver adapted to enter a relatively high power consumptive state from a relatively low power consumptive state during times when a signal is present within the communication line, and wherein said receiver is further adapted to enter said relatively low power consumptive state from the relatively high power consumptive state during times when the signal is absent from the communication line, and wherein the receiver comprises a phase-locked loop (PLL) which produces a clocking signal at a reduced clocking frequency and forwards the clocking signal to a respective digital system when the PLL is not locked in sync with transitions of the signal; and
   a lock detector which bypasses forwarding the signal to the digital system, and forwards the signal directly to a transmitter of the transceiver, when the PLL is not locked in sync with transitions of the signal.

3. The communication system as recited in claim 2, wherein the lock detector is embodied within the digital system.

4. The communication system as recited in claim 2, wherein said communication line comprises an optical fiber.

5. The communication system as recited in claim 4, wherein the receiver comprises a photodetector arranged in proximity to the optical fiber.

6. The communication system as recited in claim 2, wherein said digital system comprises a digital signal processor.

7. The communication system as recited in claim 2, wherein said receiver enters said relatively high power consumptive state when the signal is forwarded to the receiver via the communication line.

8. The communication system as recited in claim 2, wherein at least a portion of each of the transceivers is embodied upon a single monolithic substrate dissimilar from the digital systems.

9. The communication system as recited in claim 2, wherein a connection between one of the plurality of digital systems and a respective transceiver consists of a power supply conductor, a ground conductor, a clocking signal conductor, a receive data conductor and a transmit data conductor.

10. The communication system as recited in claim 2, wherein a connection between one of the plurality of digital systems and a respective transceiver comprises a clock/status conductor adapted to transmit a signal indicative of the presence or absence of the signal within the communication line.

11. The communication system as recited in claim 2, wherein a connection between one of the plurality of digital systems and a respective transceiver comprises a clock/status conductor adapted to transmit a signal indicative of the frequency at which the signal transitions within the communication line.

12. The communication system as recited in claim 2, wherein the plurality of digital system are interconnected in a ring topology.

* * * * *